Sept. 20, 1938.  W. A. GANTNER  2,130,667
BRAKE RIGGING
Filed Dec. 10, 1937
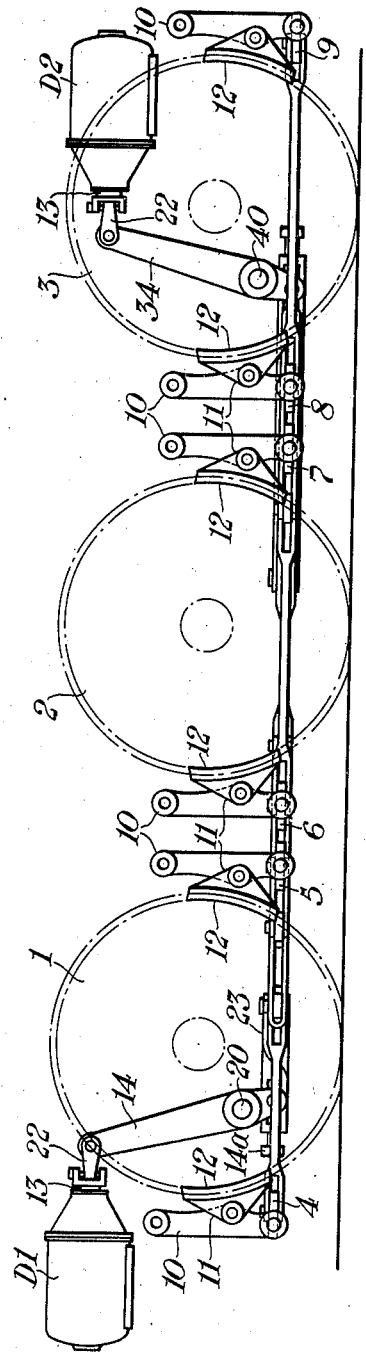
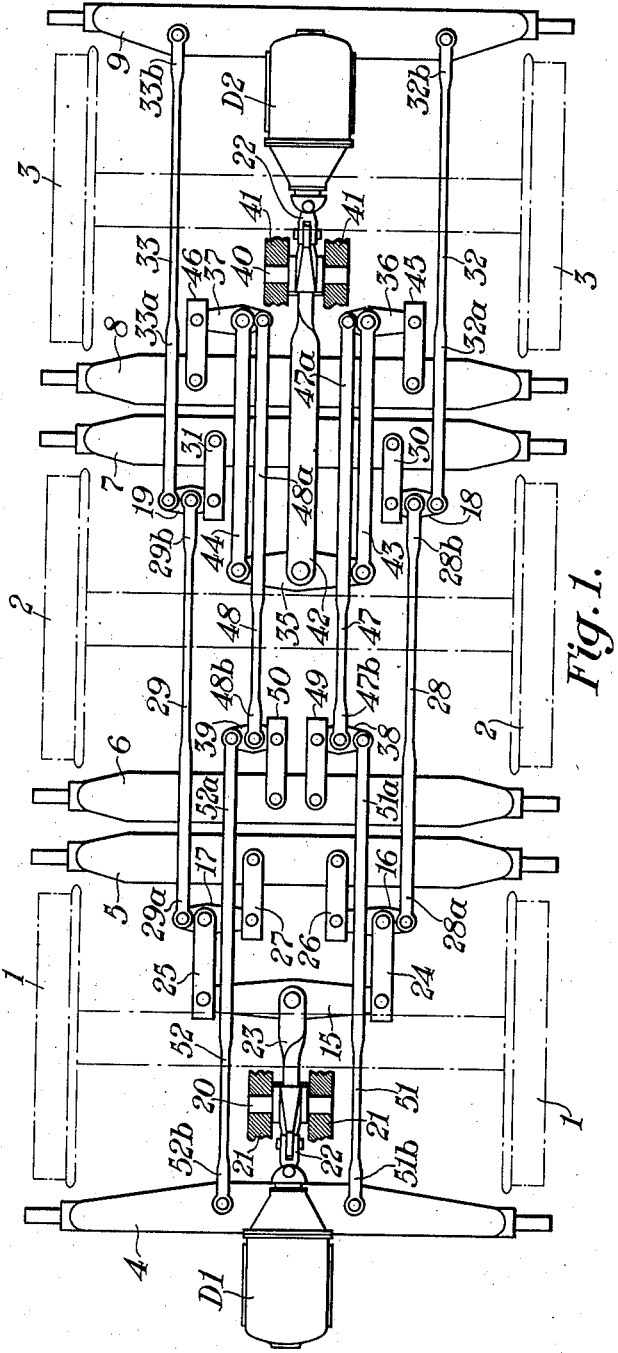
INVENTOR
William A. Gantner
BY
HIS ATTORNEY Patented Sept. 20, 1938

2,130,667

UNITED STATES PATENT OFFICE 2,130,667

BRAKE RIGGING

William A. Gantner, Wilkinsburg, Pa., assignor to The American Brake Company, Swissvale, Pa., a corporation of Missouri Application December 10, 1937, Serial No. 179,158

8 Claims. (Cl. 188—46)

My invention relates to brake rigging for railway vehicles, and particularly to brake rigging for six wheel locomotive engine trucks wherein brake shoes are applied to both sides of each wheel.

One object of my invention is to provide a brake rigging of the type described having two separate and independent sets of interconnected rods and levers, one for actuating the brake shoes which are located at the forward sides of the wheels, and another for actuating the brake shoes which are located at the rear sides of the wheels, whereby, if the brakes which are located on the one side of the wheels fail to function for any reason, an equalized braking effort will still result on each wheel from the brakes which are located on the other side of the wheels.

Another object of my invention is to provide a brake rigging of the type described, the operating parts of which are so located with respect to the adjacent parts of the vehicle as to permit the proper movement of the various parts of the rigging without interference with or by the adjacent parts of the vehicle.

The said invention is an improvement on that disclosed in an application for Letters Patent of the United States, Serial No. 119,651, filed by Fred C. Craig, on January 8, 1937, for Brake rigging.

I shall describe one form of brake rigging embodying my invention, and shall then point out the novel features thereof in claims.

In the accompanying drawing, Fig. 1 is a top plan view showing brake rigging embodying my invention applied to the wheels of a six wheel engine truck, the usual hanger levers, brake heads, and brake shoes being omitted to simplify the drawing. Fig. 2 is a side elevational view of the brake rigging shown in Fig. 1.

Similar reference characters refer to similar parts in both views.

Referring to the drawing, the reference characters 1, 2, and 3 designate the wheels of a six wheel engine truck such as is now being proposed for use in place of the usual two or four wheel engine truck, the various parts of the truck other than the wheels being omitted from the drawing to simplify and clarify the disclosure.

Disposed at the forward and rear sides, respectively, of the wheels 1 are brake beams 4 and 5, and disposed at the forward and rear sides, respectively, of the wheels 2 are brake beams 6 and 7, while disposed at the forward and rear sides, respectively, of the wheels 3 are brake beams 8 and 9. Each brake beam is movably supported at each end from the engine frame by means of hangers 10 carrying brake heads 11 provided with brake shoes 12 for engagement with the wheels.

The three brake beams 5, 7, and 9 which are located at the forward sides of the wheels are actuated through the medium of a first set of interconnected rods and levers, by a first brake cylinder D1, while the three brake beams 4, 6, and 8 which are located at the rear sides of the wheels are actuated through the medium of a second set of interconnected rods and levers, by a second brake cylinder D2. The two brake cylinders D1 and D2 are preferably located at the longitudinal center line of the truck adjacent its rear and front ends, respectively, and may be secured to the truck frame in any convenient manner not shown. The two brake cylinders are of the usual type, and each includes the usual cylinder portion, reciprocable piston (not shown), return spring (not shown), and push rod 13 operated by the piston.

The set of operatively connected rods and levers which actuate the three forward brake beams 5, 7, and 9 includes a vertically disposed brake cylinder lever 14, a horizontally disposed main equalizer lever 15, and four horizontally disposed auxiliary equalizer levers 16, 17, 18, and 19.

The brake cylinder lever 14 is pivotally supported intermediate its ends, at the rear side of the axle which connects the wheels 1, on a pivot pin 20 mounted in suitable spaced supports 21 provided on the truck frame, and is operatively connected at its upper end with the push rod 13 of the brake cylinder D1 by means of a clevis connection 22. The lower end of the lever 14 is operatively connected through the medium of a slack adjuster 14a of the usual and well-known construction with one end of a strap link 23, the other end of which is pivotally connected with the center of the main equalizer lever 15.

The main equalizer lever 15 and the two auxiliary equalizer levers 16 and 17 are located at the rear side of the brake beam 5 in the same horizontal plane as this brake beam, and the opposite ends of the main equalizer lever are operatively connected with the two auxiliary levers intermediate their ends by means of strap links 24 and 25. The inner end of the auxiliary equalizer lever 16 is pivotally connected to a member 26 which is rigidly secured to the brake beam 5, and the inner end of the auxiliary equalizer lever 17 is similarly pivotally connected to a member 27 which is also rigidly secured to the brake beam 5, the points at which the members 26 and 27 are secured to the brake beam 5 being equally spaced from the adjacent ends of the beam. The outer end of the auxiliary equalizer lever 16 is operatively connected through the medium of a pull rod 28 with the auxiliary equalizer lever 18, while the outer end of the auxiliary equalizer lever 17 is operatively connected through the medium of a pull rod 29 with the auxiliary equalizer lever 19. The pull rod 28 is provided at the end which is connected with the auxiliary equalizer lever 16 with a jaw 28a which straddles the brake beams 5 and 6 with sufficient clearance to permit free longitudinal movement of the pull rod relative to these brake beams, and which receive the equalizer lever 16 with some clearance, and at the opposite end with a jaw 28b which receives the equalizer lever 18 with some clearance. The pull rod 29 is similarly provided at the end which is connected with the equalizer lever 17 with a jaw 29a which straddles the brake beams 5 and 6 with sufficient clearance to permit free longitudinal movement of this rod relative to these brake beams; and which receives the equalizer lever 17 with some clearance, and at its opposite end with a jaw 29b which receives the equalizer lever 19 with some clearance.

The two equalizer levers 18 and 19 are located at the rear side of the brake beam 7 in the same plane as this brake beam, and are operatively connected at their lower ends with the brake beam 7 at points equally spaced from the ends of this brake beam by means of members 30 and 31, respectively, which are rigidly secured to this brake beam, and which receive the equalizer levers at their free ends with some clearance. The outer ends of the auxiliary equalizer levers 18 and 19 are operatively connected with the brake beam 9 at points equally spaced from its end by means of pull rods 32 and 33, respectively. The pull rod 32 is similar to the pull rods 28 and 29 and is provided at the end which is connected with the auxiliary equalizer lever 18 with a jaw 32a which straddles the brake beams 7 and 8 with sufficient clearance to permit free longitudinal movement of the pull rod relative to these brake beams, and which receives the lever 18 with some clearance, and at the opposite end with a jaw 32b which receives the brake beam 9 with some clearance. The pull rod 33 is likewise similar to the pull rods 28 and 29, and is provided at the end which is connected with the auxiliary equalizer lever 19 with a jaw 33a which straddles the brake beams 7 and 8 with sufficient clearance to permit free longitudinal movement of the pull rod relative to these last mentioned brake beams, and which receives the lever 19 with some clearance, and at the opposite end with a jaw 33b which receives the brake beam 9 with some clearance.

The set of operatively connected rods and levers which actuates the rear brake beams 4, 6, and 8 is slightly different from the set just described and includes a vertically disposed cylinder lever 34, a horizontally disposed main equalizer lever 35, and four horizontally disposed auxiliary equalizer levers 36, 37, 38, and 39. The brake cylinder lever 34 is pivotally supported intermediate its ends, in rear of the axle which connects the wheels 3, on a pin 40 mounted in suitable supports 41 provided on the engine frame, and is operatively connected at its upper end with the push rod 13 of the brake cylinder D2 by means of the clevis connection 22. The lower end of the lever 34 is operatively connected with one end of a strap link 42 by means of a slack adjuster which is similar in all respects to the slack adjuster which connects the lower end of the lever 14 with the strap link 23. The strap link 42 straddles the brake beams 7 and 8 with sufficient clearance to permit free longitudinal movement of this link relative to these brake beams, and is pivotally connected at its free end with the center of the main equalizer lever 35.

The main equalizer lever 35 is disposed in the rear of the brake beam 7 in the same horizontal plane as the two brake beams 7 and 8, and is operatively connected at its opposite ends with the auxiliary equalizer levers 36 and 37 intermediate their ends by means of strap links 43 and 44. The auxiliary equalizer levers 36 and 37 are disposed adjacent the forward side of the brake beam 8 in the same horizontal plane as the brake beams 7 and 8, and the strap links 43 and 44 straddle the two brake beams 7 and 8 with sufficient clearance to permit free relative longitudinal movement of these strap links relative to these brake beams. The outer end of the auxiliary equalizer lever 36 is pivotally connected to a member 45 which is rigidly secured to the brake beam 8, and the outer end of the auxiliary equalizer lever 37 is similarly pivotally connected to a member 46 which is also rigidly secured to the brake beam 8. The inner end of the auxiliary equalizer lever 36 is operatively connected through the medium of a pull rod 47 with the auxiliary equalizer lever 38 intermediate its ends, and the inner end of the auxiliary equalizer lever 37 is similarly operatively connected through the medium of a pull rod 48 with the auxiliary equalizer lever 39 intermediate its ends. The pull rod 47 is provided at the end which is connected with the equalizer lever 36 with a jaw 47a which straddles the main equalizer lever 35 and the two brake beams 7 and 8 with sufficient clearance to permit free longitudinal movement of this pull rod relative to these parts, and the end which is connected with the auxiliary equalizer lever 38 is provided with a jaw 47b which receives this equalizer lever with some clearance. The pull rod 48 is similar to the pull rod 47 and is provided at one end with a jaw 48a which straddles the main equalizer lever 35 and the two brake beams 7 and 8 with sufficient clearance to permit free relative longitudinal movement of this pull rod relative to these parts, and at the end which is connected with the auxiliary equalizer lever 39 with a jaw 48b which receives this equalizer lever with some clearance.

The auxiliary equalizer levers 38 and 39 are disposed in the same plane as the brake beams 5 and 6 adjacent the forward side of the brake beam 6 and are operatively connected at their inner ends with the brake beam 6 by means of members 49 and 50 which are rigidly secured to this brake beam. The outer ends of the auxiliary equalizer levers 38 and 39 are operatively connected with the brake beam 4 at points equally spaced from its ends by means of pull rods 51 and 52. The pull rod 51 is provided at the end which is connected to the equalizer lever 38 with a jaw 51a which straddles the main equalizer lever 15, the auxiliary equalizer lever 16, and the two brake beams 5 and 6 with sufficient clearance to permit free longitudinal movement of the pull rod relative to these parts, and at its opposite end with a jaw 51b which receives the brake beam 4 with some clearance. The pull rod 52 is similar to the pull rod 51, and is provided at the end which is connected with the auxiliary equalizer lever 39 with a jaw 52a which straddles the main equalizer lever 15, the auxiliary equalizer lever 16, and the two brake beams 5 and 6 with sufficient clearance to permit free longitudinal movement of this pull rod relative to these members, and at its opposite end with a jaw 52b which receives the brake beam 4 with some clearance.

With the above described construction, it will be noted that all of the interconnected rods and levers of each set with the exception of the two brake cylinder levers 14 and 34 are located in the same horizontal plane as the brake beams, and are supported solely by the brake beams, thus eliminating the necessity for auxiliary supporting means, and hence greatly simplifying the mounting of the brake rigging on the engine truck.

When it is desired to apply the brakes, fluid under pressure is simultaneously supplied to both brake cylinders D1 and D2 through the usual air brake control means, thereby causing the pistons of these cylinders to move outwardly, and move the associated push rods 13 outwardly. The outward movement of the push rod 13 of cylinder D1 acts through the brake cylinder lever 14 and strap link 23 to apply power to the main equalizer lever 15, which power is transmitted by means of the strap links 24 and 25 to the auxiliary equalizer levers 16 and 17 in equal stresses. At the auxiliary equalizer levers 16 and 17 the powers divide, and one-third of this power is transmitted through the medium of the members 26 and 27 to the brake beam 5, while the remaining two-thirds of this power is transmitted through the medium of the pull rods 28 and 29 to the auxiliary equalizer levers 18 and 19 in equal stresses. The power which is supplied to the auxiliary equalizer levers 18 and 19 again divides, and one-half of this power is transmitted through the medium of the members 30 and 31 to the brake beam 7, while the remaining half of this power is transmitted through the medium of the pull rods 32 and 33 to the brake beam 9. It will be seen, therefore, that the movement of the push rod 13 of the cylinder D1 applies all the brake shoes on the forward sides of the wheels with equal stresses. The outward movement of the push rod 13 of the brake cylinder D2 similarly acts, through the brake cylinder lever 34 and strap link 42 to apply power to the main equalizer lever 35, which power is transmitted in equal stresses by means of the links 43 and 44 to the auxiliary equalizer levers 36 and 37. At the auxiliary equalizer levers 36 and 37 the power divides and one-third of this power is transmitted to the brake beam 8 by means of the members 45 and 46, while the remaining two-thirds of this power is transmitted through the medium of the pull rods 47 and 48 to the auxiliary equalizer levers 38 and 39. At the auxiliary equalizer levers 38 and 39 the power again divides and one-half is transmitted to the brake beam 6 through the medium of the members 49 and 50, while the remaining half is transmitted to the brake beam 4 by means of the pull rods 51 and 52. It will be seen, therefore, that the outward movement of the push rod 13 of the cylinder D2 acts to apply all the brake shoes on the rear sides of the wheels with equal stresses.

To release the brakes, the fluid which was previously supplied to the brake cylinders D1 and D2 is vented to atmosphere in the usual manner, thereby permitting the release spring within the brake cylinders to retract the pistons, and hence permitting the various parts of the brake rigging to move to their release positions.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a brake rigging for a six wheel engine truck, in combination, brake shoes disposed on both sides of each wheel, fluid pressure operated means for moving all of the shoes on the forward sides of the wheels into engagement with the wheels, and other fluid pressure operated means for moving all of the shoes on the rear sides of the wheels into engagement with the wheels.

2. In a brake rigging for a six wheel engine truck, in combination, a plurality of brake beams one located on each side of each pair of wheels, equalizing linkage connected with the brake beams on the forward sides of the wheels for actuating such brake beams, and other equalizing linkage connected with the brake beams on the rear sides of the wheels for actuating these brake beams.

3. In a brake rigging for a six wheel engine truck, in combination, six brake beams one located on each side of each pair of wheels, a first brake cylinder disposed adjacent one end of said truck, means including a main equalizer lever and two pairs of auxiliary equalizer levers for connecting said brake cylinder with each of the brake beams at the forward sides of the wheels in such manner that an equal force will be applied to each such brake beam, a second brake cylinder disposed adjacent the other end of said truck, and means including a main equalizer lever and two pairs of auxiliary equalizer levers for connecting said second brake cylinder with each of the brake beams at the rear sides of the wheels in such manner that an equal force will be applied to each such brake beam.

4. In a brake rigging for a six wheel engine truck, in combination, six brake beams one located on each side of each pair of wheels, a first brake cylinder disposed adjacent the rear end of said truck, means including a vertically disposed brake cylinder lever pivotally mounted on said truck in rear of the axle connecting the rear pair of wheels for operatively connecting said first brake cylinder with each of the brake beams at the forward sides of the wheels, a second brake cylinder disposed adjacent the forward end of said truck, and means including a vertically disposed brake cylinder lever pivotally mounted on said truck in rear of the axle connecting the forward pair of wheels for operatively connecting said second brake cylinder with each of the brake beams at the rear sides of the wheels.

5. In a brake rigging for a six wheel engine truck, in combination, six brake beams one located on each side of each pair of wheels, a first brake cylinder disposed adjacent the rear end of said truck, means including a first vertically disposed brake cylinder lever and a plurality of horizontally disposed equalizer levers for operatively connecting said first brake cylinder with each brake beam at the forward sides of the wheels, a second brake cylinder disposed adjacent the forward end of said truck, and means including a second vertically disposed brake cylinder lever and a plurality of horizontally disposed equalizer levers for operatively connecting said second brake cylinder with each brake beam at the rear sides of the wheels.

6. In a brake rigging for a six wheel engine truck, in combination, six brake beams one located on each side of each pair of wheels, a first brake cylinder disposed adjacent the rear end of said truck, means including a first brake cylinder lever, a first main equalizer lever and four auxiliary equalizer levers for operatively connecting said first brake cylinder with each brake beam at the forward sides of the wheels, a second brake cylinder disposed adjacent the forward end of the truck, and means including a second brake cylinder lever, a second main equalizer lever and four auxiliary equalizer levers for operatively connecting said second brake cylinder with each brake beam at the rear sides of the wheels.

7. In a brake rigging for a six wheel engine truck, in combination, six brake beams one located on each side of each pair of wheels, a first pair of equalizer levers each operatively connected at one end with the brake beam at the forward side of the middle pair of wheels and at the other end with the brake beam at the forward side of the front pair of wheels, a second pair of equalizer levers each operatively connected at one end with the brake beam at the forward side of the rear pair of wheels and at the other end with a different lever of said first pair intermediate its ends, a first main equalizer lever connected at its ends with the equalizer levers of said second pair intermediate their ends, a first brake cylinder operatively connected with said first main equalizer lever intermediate its ends, a third pair of equalizer levers each operatively connected at one end with the brake beam at the rear side of said middle pair of wheels and at the other end with the brake beam at the rear side of the rear pair of wheels, a fourth pair of equalizer levers each operatively connected at one end with the brake beam at the rear side of the forward pair of wheels and at the other end with a different one of the equalizer levers of said third pair intermediate its ends, a second main equalizer lever operatively connected at its ends with the equalizer levers of said fourth pair intermediate their ends, and a second brake cylinder operatively connected with said second main equalizer lever intermediate its ends.

8. In a brake rigging for an engine truck, in combination, brake shoes disposed on both sides of each wheel, two brake cylinders one disposed at each end of the truck, means including a vertically disposed brake cylinder lever located in rear of the forward axle for connecting the brake cylinder at the forward end of the truck with all of the brake shoes at the rear sides of the wheels, and means including a vertically disposed brake cylinder lever located in rear of the rear axle for connecting the brake cylinder at the rear end of the truck with all of the brake shoes at the forward sides of the wheels.

WILLIAM A. GANTNER.